(12) United States Patent
Ye et al.

(10) Patent No.: US 7,401,193 B1
(45) Date of Patent: Jul. 15, 2008

(54) SYSTEM FOR STORING DATA

(75) Inventors: Hua Ye, Milpitas, CA (US); Qingyuan Wang, Tracy, CA (US); Huiqiong Yang, San Jose, CA (US)

(73) Assignee: Promise Technology, Inc., Milpitas, CA (US)

( * ) Notice: Subject to any disclaimer, the term of this patent is extended or adjusted under 35 U.S.C. 154(b) by 434 days.

(21) Appl. No.: 10/976,974

(22) Filed: Oct. 29, 2004

(51) Int. Cl.
*G06F 12/00* (2006.01)

(52) U.S. Cl. .......................................... 711/162; 714/6

(58) Field of Classification Search .............. 711/114, 711/161, 162, 112, 202, 203, 206, 207; 714/6, 714/4; 709/248, 213, 220
See application file for complete search history.

(56) References Cited

U.S. PATENT DOCUMENTS

| | | | |
|---|---|---|---|
| 5,469,453 A * | 11/1995 | Glider et al. ................ | 714/6 |
| 6,502,166 B1 | 12/2002 | Cassidy | |
| 7,111,118 B2 * | 9/2006 | Mereddy et al. ............ | 711/114 |
| 7,133,965 B2 * | 11/2006 | Chien ......................... | 711/114 |
| 7,203,732 B2 * | 4/2007 | McCabe et al. ............. | 709/217 |
| 7,340,640 B1 * | 3/2008 | Karr et al. .................. | 714/6 |
| 2003/0070043 A1 * | 4/2003 | Merkey ....................... | 711/114 |
| 2005/0144512 A1 * | 6/2005 | Ming ........................... | 714/6 |

OTHER PUBLICATIONS

Thekkath, C., et al, "Frangipani: A Scalable Distributed File System," In Proceedings of the 16.sup.th ACM Symposium on Operating Systems Principles, Oct. 1997, 14 pages.*

* cited by examiner

*Primary Examiner*—Pierre-Michel Bataille
(74) *Attorney, Agent, or Firm*—Mikio Ishimaru

(57) ABSTRACT

A system is provided for storing data includes storing original data in logical blocks in a first plurality of locations in a data storage system with one and only one logical block of mirrored data early mirrored in the first plurality of locations and storing mirrored data in logical blocks in a second plurality of locations in the data storage system.

20 Claims, 4 Drawing Sheets

SYSTEM FOR STORING DATA

TECHNICAL FIELD

The present invention relates generally to data storage technology, and more particularly to RAID technology.

BACKGROUND ART

In every industry, computers are coming into everyday use. These computers are used to write and read data to large storage devices to store and recall the tremendous volumes of information that are increasingly required by small and large businesses.

Storage devices in all computer systems are susceptible to failures. This is especially true in disc drives where failures can be caused by temperature variations, head crashes, motor failure, controller failure, and changing voltage conditions. Modern computer systems for critical systems, such as airport controllers, require a fault-tolerant data storage system, for protecting data against disk drive failure.

One approach to meeting this need is to provide a redundant array of independent disks (RAID) system operated by a disk array controller (controller). RAID technology developed to provide for reliable storage of data on multiple storage devices. RAID allows the combining of two or more storage devices, such as disk drive systems, to create an array of storage devices.

Hardware or software implementation allows the multiple storage devices to be treated as one logical storage device. Data is stored redundantly in various ways to enhance data integrity and availability. RAID sub-systems provide cost-effective solutions for storage strategies. RAID systems are also able to provide improved data transfer rates and throughput of data.

RAID technology provides various ways to use multiple storage devices to increase availability and performance. A number of RAID levels have been defined in which each level provides unique throughput and fault tolerance characteristics. Several RAID levels provide fault tolerance such that if one of the multiple storage devices fails, then access to all data stored on the array is still available. The failed storage device may be replaced or repaired while the array is still usable and accessible as though there had been no failure.

One of the RAID levels is "RAID 0", which uses storage device spanning. Storage device spanning allows multiple storage devices to be logically and serially linked into a single large logical storage device. RAID 0 uses a "data striping" layout in which data is evenly distributed across the physical storage devices to maximize input or output performance. Data striping divides the logical storage device into data sequences called stripes, which are distributed over the storage devices. The layout is such that a sequential read of data on the logical storage device results in parallel reads to the storage devices. RAID 0 provides performance acceleration through data striping. However, RAID 0 does not provide redundancy.

Another of the RAID levels is "RAID 1", which uses data mirroring. With data mirroring, a single logical storage device is created from two physical storage devices. All data written to the logical storage device is written identically to the two storage devices. Thus, a pair of storage devices with identical data is created. If one of the physical storage devices fails, the same data is still accessible from the other physical storage device by using a hot-spare storage device to reestablish the mirror relationship and redundancy while the failed storage device is being replaced or repaired. RAID 1 provides redundancy through mirrored copy of data and better read performance than RAID 0. However, RAID 1 has worse write performance than RAID 0 and an even number of physical storage devices is required. RAID 1 is most particularly useful when performance is more important than capacity and when the device configuration is limited to two storage devices.

"RAID 1 Enhanced" (RAID 1E) combines data mirroring with data striping. Data is striped across each storage device in the array. The first set of stripes is the data stripes while the second set of stripes is the mirror stripes (copies) of the first data stripes that are shifted one storage device. RAID 1E shares the same characteristics of RAID 1 but additionally allows more than two storage devices as part of the storage device array and also allows an odd number of storage devices as part of the storage device array. However, RAID 1E still has worse write performance than RAID 0.

Solutions to these problems have been long sought but prior developments have not taught or suggested any solutions and, thus, solutions to these problems have long eluded those skilled in the art.

DISCLOSURE OF THE INVENTION

The present invention provides a system for storing data including storing original data in logical blocks in a first plurality of locations in a data storage system with one and only one logical block of mirrored data early mirrored in the first plurality of locations and storing mirrored data in logical blocks in a second plurality of locations in the data storage system.

Certain embodiments of the invention have other advantages in addition to or in place of those mentioned above. The advantages will become apparent to those skilled in the art from a reading of the following detailed description when taken with reference to the accompanying drawings.

BEST MODE FOR CARRYING OUT THE INVENTION

Figure 1:
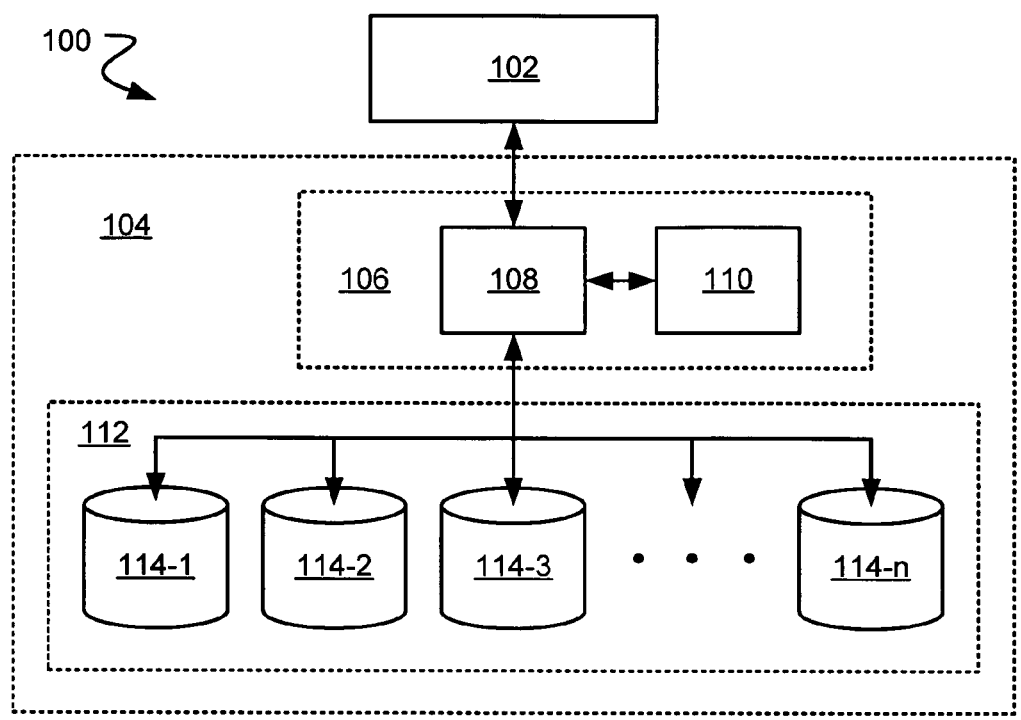
FIG. 1 is a block diagram of one embodiment of a computer system according to one embodiment of the present invention.

In the following description, numerous specific details are given to provide a thorough understanding of the invention. However, it will be apparent that the invention may be practiced without these specific details. In order to avoid obscuring the present invention, some well-known configurations and process steps are not disclosed in detail.

Likewise, the drawings showing embodiments of the invention are semi-diagrammatic and not to scale and, particularly, some of the dimensions are for the clarity of presentation and are shown exaggerated in the FIGs. Also, where multiple embodiments are disclosed and described having some features in common, for clarity and ease of illustration, description, and comprehension thereof, similar and like features one to another will ordinarily be described with like reference numerals.

Referring now to FIG. 1, therein is shown a block diagram of one embodiment of a computer system 100 according to one embodiment of the present invention. The computer system has one or more independently or co-operatively operated host computers represented by a host computer system 102.

The host computer system 102 is connected to a data storage system 104, which in the present embodiment is a redundant array of independent disks (RAID) system. The RAID system 104 includes one or more independently or co-operatively operating controllers represented by a controller system 106.

The controller system 106 generally contains a processor 108 (performing functions performed by a microprocessor and a digital signal processor) and a memory 110. The processor 108 processes data and executes programs from the memory 110.

The processor 108 is connected to a RAID storage subsystem 112, which includes a number of storage units, such as disk drive systems 114-1 . . . n. The processor 108 processes data between the host computer system 102 and the disk drive systems 114-1 . . . n.

The RAID system 104 provides fault tolerance to the host computer system 102, at a disk drive level. If one or more disk drive systems 114-1 . . . n fails, the controller system 106 can typically rebuild any data from the one or more failed disk drive systems 114-1 . . . n onto any surviving disk drive systems. In this manner, the RAID system 104 handles most disk drive failures without interrupting any requests from the host computer system 102.

Figure 2:
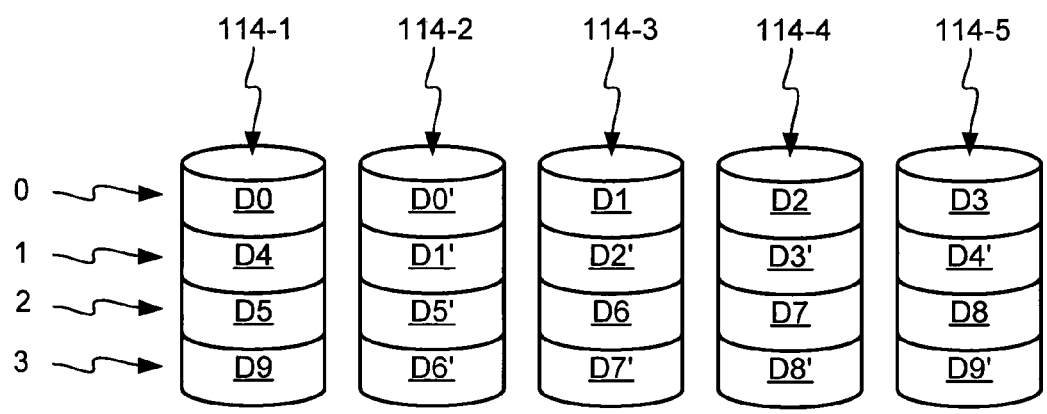
FIG. 2 is a block diagram of a portion of the RAID storage subsystem illustrating aspects of data distributed across exemplary five disk drive systems.

Referring now to FIG. 2, therein is shown a diagram of a portion of the RAID storage subsystem 112 illustrating data distributed across an exemplary five disk drive systems 114-1 . . . 5 according to one embodiment of the present invention. Original data are blocks D0 . . . D9 and mirrored data are blocks D0' . . . D9'. The mirrored data are early mirrored, which means mirrored data block D0' is stored proximate to original data block D0 and not on the last disk drive system, such as the disk drive system 114-5. The data blocks are in stripes 0 to 3.

Figure 3:
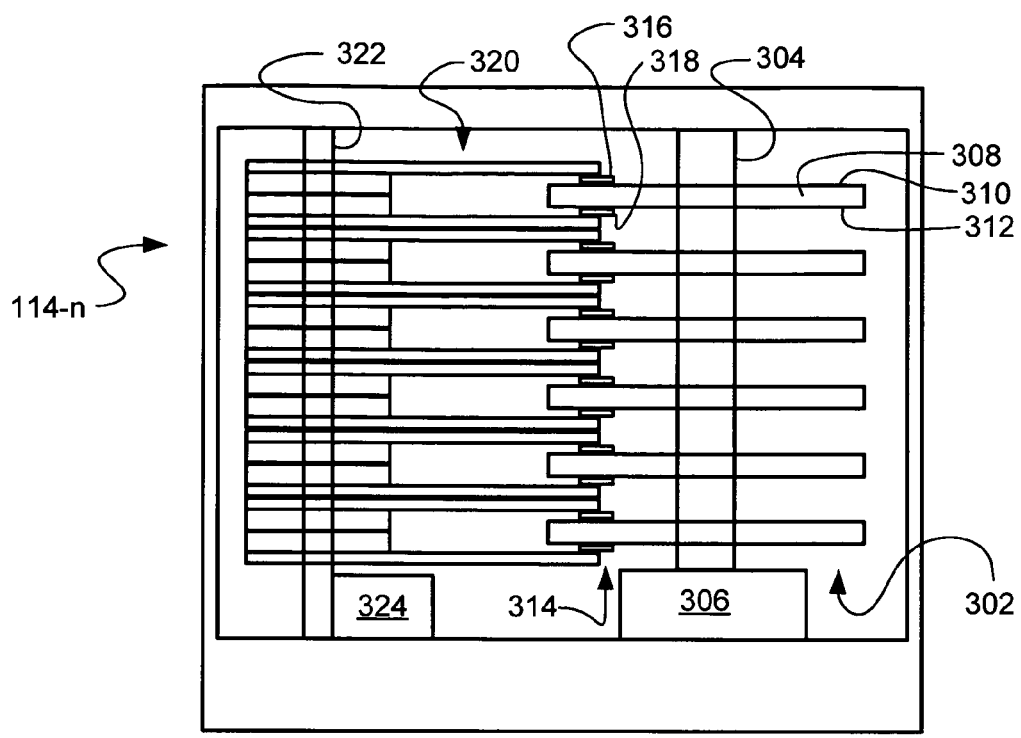
FIG. 3 is a disk drive system according to an embodiment of the present invention.

Referring now to FIG. 3, therein is shown a disk drive system 114-n according to an embodiment of the present invention. The disk drive system 114-n contains a number of horizontal disks referred to as platters, such as the platters 302. The platters 302 spin at high speed, around 10,000 rpm, as a single unit on a vertical central spindle 304 driven by a spindle motor 306.

The term "horizontal" as used in herein is defined as a plane parallel to the conventional plane or surface of a disk/platter, such as one of the platters 302, regardless of the orientation of the platter. The term "vertical" refers to a direction perpendicular to the horizontal as just defined. Terms, such as "on", "above", "below", "side", "topside", "underside", "over", and "under", are defined with respect to the horizontal plane.

Each of platters 302, such as the platter 308, has two disk surfaces, a topside and an underside data storage surface 310 and 312, respectively. The data storage surfaces are capable of retaining magnetic flux variations that are sensed to retrieve, or read, data and that are modified to store, or write, data.

Each of the data storage surfaces has one of the read/write heads 314; e.g., the data storage surfaces 310 and 312 have associated magnetic read/write heads 316 and 318, respectively. The read/write heads 314 are all vertically stacked one over the other to read/write to vertically stacked data tracks. The read/write heads 314 are suspended over the platters 302 by an actuator arm unit 320 on a pivot 322, which is driven by a pivot arm drive 324 controlled by the controller system 106 of FIG. 1. When the platters 302 are rotated at high speed, a cushion of air forms and the read/write heads 314 are lifted out of direct contact with the platters 302.

Figure 4:
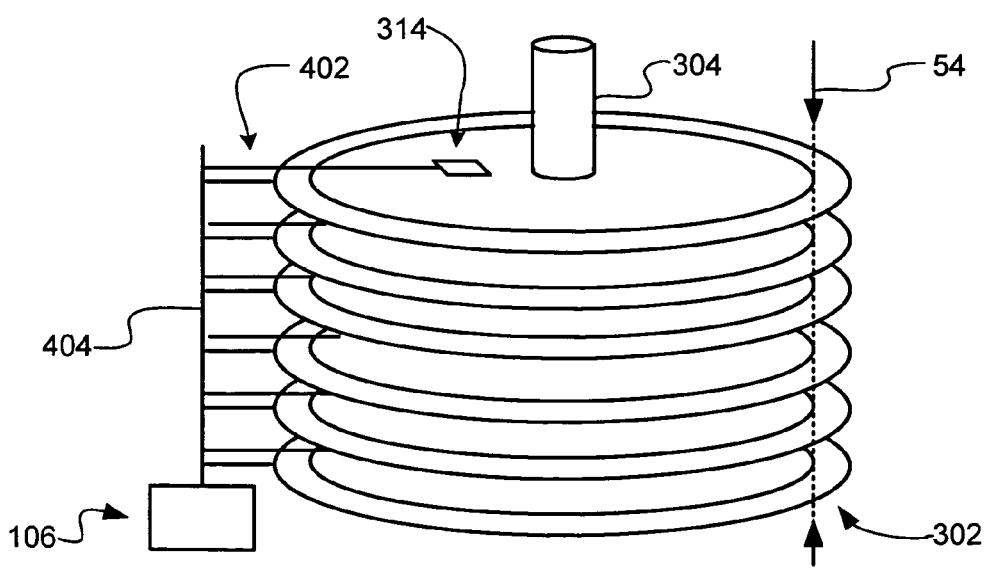
FIG. 4 is an isometric illustration of the read/write components of the disk drive system according to an embodiment of the present invention.

Referring now to FIG. 4, therein is shown an isometric illustration of the read/write components of the disk drive system 114-n according to an embodiment of the present invention. The read/write heads 314 are connected to read/write leads 402, which connect the read/write heads 314 to a read/write data channel 404. The read/write data channel 404 is connected in turn to the controller system 106.

The controller system 106 manages the read/write heads 314, the spindle motor 306, and performs a data layout mapping between the logical addresses presented to a client computer system and the addresses of the sectors on the platters 302. Original or mirrored data are stored as blocks of data or logical blocks (LBs) by logical block addresses (LBAs). LBs are organized in a disk drive system in a sequential manner, such that a first LB has a lower LBA than a second, subsequent LB.

The controller system 106 controls the pivot arm drive 324, which provides precise rotary movements of the actuator arm unit 320 to position the read/write heads 314 over particular LBAs on the platters 302.

Figure 5:
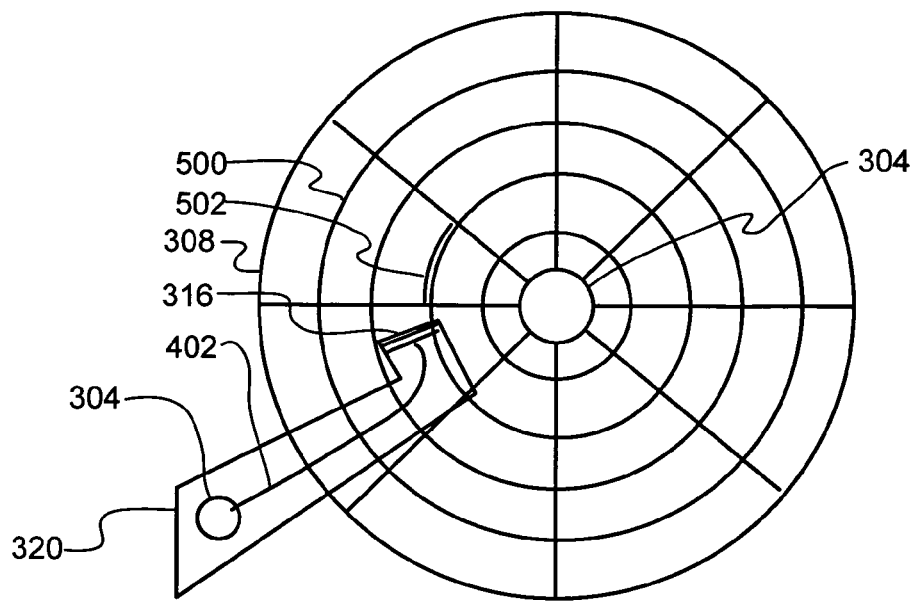
FIG. 5 is a top view of a typical platter, such as the platter, according to an embodiment of the present invention.

Referring now to FIG. 5, therein is shown a top view of a typical platter, such as the platter 308, according to an embodiment of the present invention. Each data storage surface 310 or 312 of the platter 308 is set up to store data in a series of concentric locations called sectors, which form a set of concentric circles around the vertical central spindle 304 as exemplified by a data track 500. The data track 500 includes a plurality of sectors, such as a sector 502, where a block of data may be recorded. A single vertical stack of data tracks equidistant from the spindle 304 is called a "cylinder". To access the data stored on the data track 500 for example, the read/write head 316 is moved over the data track 500 and the platter 308 rotates to allow the read/write head 316 to sense the magnetic flux changes used to store the data in the track.

Since the read/write heads 314 (shown in FIG. 2) move as a unit, moving one read/write head causes all the other read/write heads 314 to be positioned over an equivalent data location in the cylinder.

Referring to FIGS. 1 and 5, the RAID system 104 appears to the host computer system 102 as a memory device with a linear vector of addressable blocks. These data blocks are mapped to physical sectors, such as the sector 502 on the platter 308, by logical block addresses (LBAs). The controller system 106 mediates access to the platters 302 and provides transfers of data between the host computer system 102 and the RAID system 104.

Speed of operation of a RAID system is determined by the positioning time required for the read/write heads to reach a desired position on a platter. The positioning time is made up of two components: the seek time and the rotation time. The seek time is the time required to rotate on the actuator arm unit to move the read/write head over the right data track. The rotation time is the time it takes for the data stored on the sector to rotate around the vertical central spindle underneath the read/write head once it is in the proper data track. Accordingly, minimizing the seek time of the read/write head within a RAID system maximizes the speed of operation.

Referring back to FIG. 2, the process of "striping," or dividing a body of data, is used to place data from the host computer system 102 into data segments and distribute the data segments across each disk drive in the stripes 200-203 in the RAID system 104. The RAID system 104 becomes one logical storage unit as far as the host computer system 102 is concerned. Other data striping techniques, or RAID levels, include RAID levels 0 through 6. A numerically higher RAID level does not imply an increase to the RAID system's fault tolerance (reliability), I/O (Input/Output) performance, or scalability. The numerical levels refer to different techniques that balance various levels of reliability, I/O performance, and scalability.

RAID 0 has exceptional I/O performance because, as data is written to or read from the disk drive array in response to a group of I/O requests, each disk drive system 114-1 . . . n comes into play to satisfy the I/O requests. Optimal I/O performance is realized in systems that use RAID level 0, because each disk drive system comes into play to satisfy the ensemble of I/O requests.

However, RAID 0 is redundant in name only, and offers no fault tolerance. If RAID 0 were fault tolerant, the techniques typically used to provide fault tolerance would slow down the I/O performance typically available through the use of RAID 0. Because RAID 0 is not fault tolerant, it is not a viable solution in systems that require reliability.

Fault tolerance in case of disk drive system failure is typically provided by a number of different techniques. These techniques include disk drive mirroring and data mirroring. Disk drive mirroring involves duplicating an original datum that is stored on a first disk drive, and storing the duplicate datum on a second disk drive. RAID 1 and 0+1 use disk drive mirroring to provide fault tolerance to a data storage subsystem. Disk drive mirroring also provides one hundred percent redundancy of data that virtually eliminates RAID system interruption due to a single disk drive system failure.

There are a number of problems with data striping techniques (RAID levels) that use disk drive mirroring to increase fault tolerance. One problem is that disk drive mirroring sacrifices I/O performance for fault tolerance. For example, consider that in a data storage subsystem implemented with either RAID 1 or RAID 0+1, only one-half of the disk drive systems are used to satisfy any read request from a host computer system. The disk drive systems that are used to satisfy a read data request are the disk drive systems that have original data stored on them. (The other one-half of the disk drive systems only come into play only if a primary disk drive fails, where the duplicate data is used to satisfy the read request). Optimal I/O performance is only realized if each disk drive system comes into play to satisfy the I/O request. Therefore, RAID levels that use disk drive mirroring are not viable solutions for systems that require fast response to read data requests.

In the disclosed embodiment of the present invention, the controller system 106 stripes and mirrors data across all disks, but always keeps one and only disk with mirror data in the same array stripe. This permits using odd and even numbers of disks in the disk drive system and provides other advantages over previous RAID systems including better write performance and improved read operations by allowing concurrent reads to be performed on multiple disks in the disk drive system.

In FIG. 2, data blocks D0, D0', and D1-D3 are in stripe 0 with the single mirror data block D0' being on a mirrored disk in the disk drive system 114-2. Stripe 1 contains data blocks D4 and D1'-D4'. The stripe 2 contains data blocks D5, D5', and D6-D8 with the mirror data block D5' being on a mirror disk in the disk drive system 114-2. Stripe 3 contains data blocks D9 and D6'-D9'.

Figure 6:
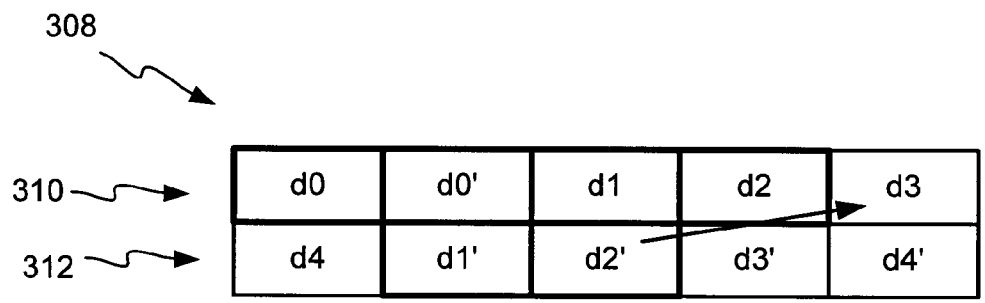
FIG. 6 is a block diagram of a portion of a platter illustrating aspects of a data layout distributed across the tracks of the platter according to one embodiment of the present invention.

Referring now to FIG. 6, therein is shown a block diagram of a portion of a platter, such as the platter 308 of FIG. 5, illustrating aspects of a data layout distributed across the tracks of the platter 308 according to one embodiment of the present invention. Original data blocks d0 . . . d9 and mirrored data blocks d0' . . . d9' are early mirrored and stored in locations on the disk surfaces 310 and 312.

The above data layout will avoid making the LBA of the disk reverse. For each disk, the read/write heads will move in one direction without reversing when servicing sequential data accesses since the data blocks are in sequential order. This will improve the performance especially for sequential write under write through mode.

For example, under a write through mode, a first request writes data from blocks d0 through d2 and a second request writes data from blocks d3 through d4. When the first request finishes writing the mirrored data at block d2', the write command for block d3 will move the read/write heads 316 and 318 for d3 forward as indicated by an arrow rather than reversing direction.

Figure 7:
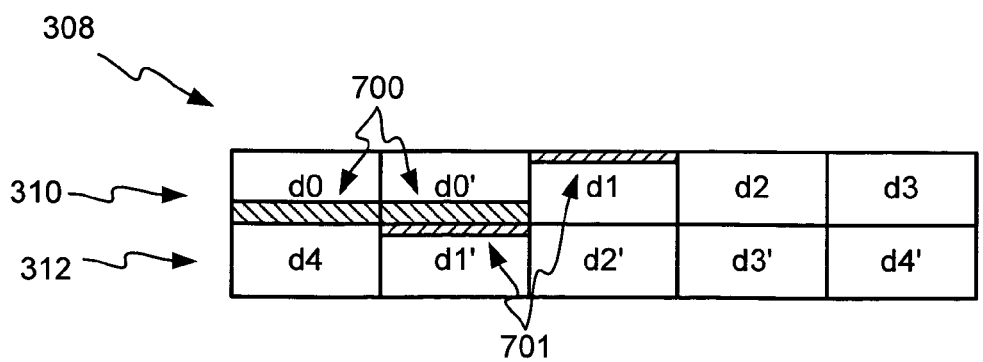
FIG. 7 is the same block diagram as shown in FIG. 6 when two sequential write requests are made.

Referring now to FIG. 7, therein is shown the same block diagram as shown in FIG. 6 when two sequential write requests are made. The first request is Write Disk Task 0 represented by the numeral 700 and the second request is Write Disk Task 1 represented by the numeral 701. With the embodiment of the present invention shown, there will not be a hole between the two write commands due to a read/write head reversal and will issue fewer requests to the disk than some previous systems.

Figure 8:
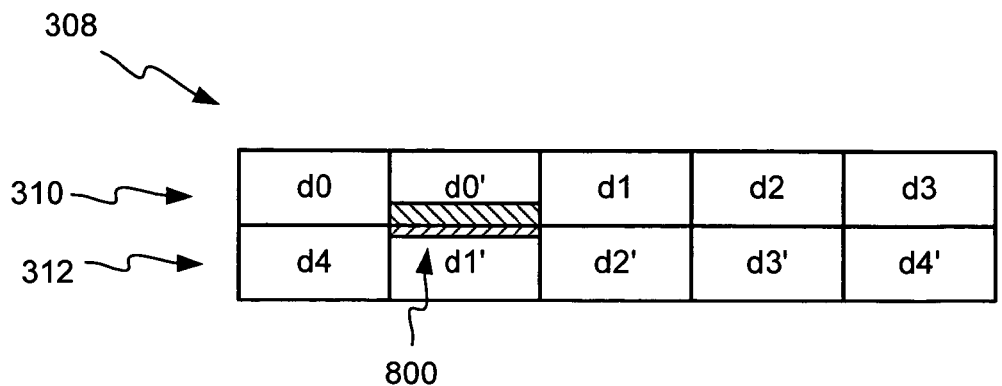
FIG. 8 is the same block diagram as shown in FIG. 6 when two disk tasks can be combined into one.

Referring now to FIG. 8, therein is shown the same block diagram as shown in FIG. 6 when two disk tasks can be combined into one. The request is Read Disk Task 0 represented by the numeral 800, which reads data from blocks d0 and d1', simultaneously. With the embodiment of the present invention shown, fewer requests are issued to the disk for the same data than in some previous systems and this improves performance.

Figure 9:
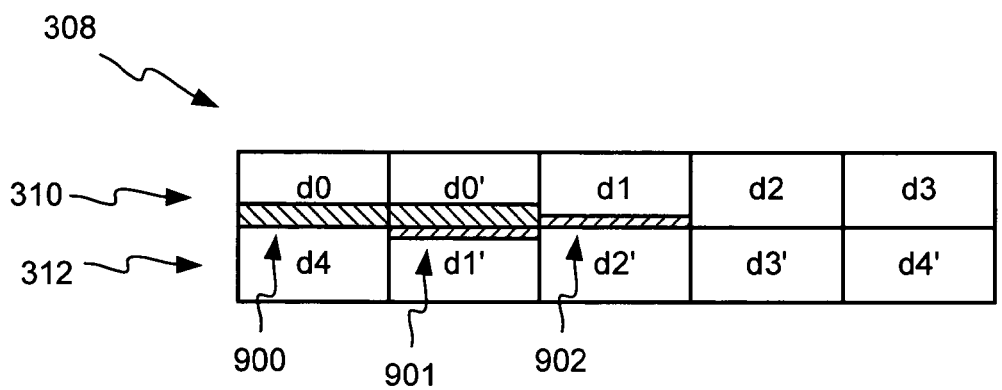
FIG. 9 is the same block diagram as shown in FIG. 6 when four disk tasks can be combined into three.

Referring now to FIG. 9, therein is shown the same block diagram as shown in FIG. 6 when four disk tasks can be combined into three. The request is Write Disk Tasks 0, 1 and 0' represented by numeral 900, which writes data to block d0, numeral 901, which writes data to blocks d0' and d1', simultaneously, and numeral 902, which writes data to block d1. The numeral 901 represents a command consolidation. With the embodiment of the present invention shown, fewer requests are issued to the disk for the same data than in some previous systems and this improves performance.

Figure 10:
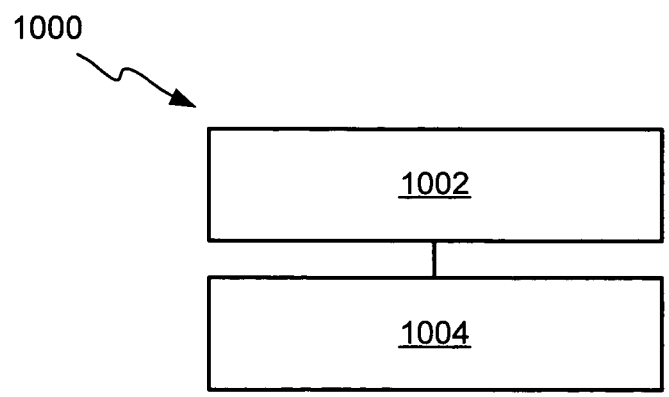
FIG. 10 is a flow chart of a system for storing data according to an embodiment of the present invention.

Referring now to FIG. 10, therein is shown a flow chart of a system 1000 for storing data. The system 1000 includes: storing original data in logical blocks in a first plurality of locations in a data storage system with one and only one logical block of mirrored data early mirrored in the first plurality of locations in a block 1002; and storing mirrored data in logical blocks in a second plurality of locations in the data storage system in a block 1004.

While the invention has been described in conjunction with specific embodiments, it is to be understood that many alternatives, modifications, and variations will be apparent in light of the aforegoing description. Accordingly, it is intended to embrace all such alternatives, modifications, and variations that fall within the scope of the included claims. All matters hithertofore set forth or shown in the accompanying drawings are to be interpreted in an illustrative and non-limiting sense.

The invention claimed is:

1. A system for storing data, comprising:
   a data storage system for storing original data in logical blocks in a first plurality of locations with one and only one logical block of mirrored data early mirrored in the first plurality of locations; and
   the data storage system for storing mirrored data in logical blocks in a second plurality of locations.

2. The system as claimed in claim 1 wherein the data storage system for storing the original data includes storing the blocks in sequential order with the blocks having sequential logical block addresses that are not reversed during storing.

3. The system as claimed in claim 1 wherein the data storage system for storing the original data and the mirrored data is for striping all the data across a plurality of locations in a plurality of different systems in the data storage system.

4. The system as claimed in claim 1 wherein the data storage system is for substantially interleaving the original data with the mirrored data on alternating pluralities of locations.

5. The system as claimed in claim 1 further comprising:
   a host computer system for providing the original data; and
   a controller system for receiving the original data from the host computer system and mirroring the original data to provide mirrored data, the controller system for providing the original data and the mirrored data to the data storage system and the host computer system.

6. A system for storing data, comprising:
   a storage subsystem for writing and reading original data in logical blocks in a first plurality of sequential locations in a stripe in the storage subsystem or on a platter with one and only one logical block of mirrored data early mirrored in the first plurality of sequential locations;
   the storage subsystem for writing and reading mirrored data in logical blocks in a second plurality of sequential locations in a stripe in the storage subsystem or on the platter; and
   the storage subsystem for interleaving the stripes of the original data and the mirrored data.

7. The system as claimed in claim 6 wherein the storage subsystem for writing the original data is for writing and reading the logical blocks in sequential order with the logical blocks having sequential logical block addresses that are not reversed during writing and reading.

8. The system as claimed in claim 6 wherein the storage subsystem for writing the original data and the mirrored data is for striping all the data across a plurality of locations in a plurality of different disk drive systems in the storage subsystem or the platter.

9. The system as claimed in claim 6 wherein the storage subsystem is for storing the data for writing or reading a logical block of original data and a logical block of mirrored data simultaneously.

10. The system as claimed in claim 6 further comprising:
    a host computer system for writing the original data; and
    a controller system for receiving the original data from the host computer and mirroring the original data to provide mirrored data, the controller system for writing and reading the original data and the mirrored data between the controller system and the storage subsystem and the host computer system.

11. A system for storing data, comprising:
    storing original data in logical blocks in a first plurality of locations in a data storage system with one and only one logical block of mirrored data early mirrored in the first plurality of locations; and
    storing mirrored data in logical blocks in a second plurality of locations in the data storage system.

12. The system as claimed in claim 11 wherein storing the original data includes storing the blocks in sequential order with the blocks having sequential logical block addresses that are not reversed during storing.

13. The system as claimed in claim 11 wherein storing the original data and the mirrored data includes striping all the data across a plurality of locations in a plurality of different systems in the data storage system.

14. The system as claimed in claim 11 further comprising substantially interleaving the original data with the mirrored data on alternating pluralities of locations.

15. The system as claimed in claim 11 further comprising:
    providing the original data from a host computer system to a controller system; and
    providing the original data and the mirrored data from the controller system to the data storage system.

16. A system for storing data, comprising:
    writing and reading original data in logical blocks in a first plurality of sequential locations in a stripe in a storage subsystem or on a platter with one and only one logical block of mirrored data early mirrored in the first plurality of sequential locations;
    writing and reading mirrored data in logical blocks in a second plurality of sequential locations in a stripe in the storage subsystem or on the platter; and
    interleaving the stripes of the original data and the mirrored data.

17. The system as claimed in claim 16 wherein writing the original data includes writing and reading the blocks in sequential order with the blocks having sequential logical block addresses that are not reversed during writing and reading.

18. The system as claimed in claim 16 wherein writing the original data and the mirrored data includes striping all the data across a plurality of locations in a plurality of different disk drive systems in the storage subsystem or the platter.

19. The system as claimed in claim 16 further comprising storing the data for writing or reading a block of original data and a block of mirrored data simultaneously.

20. The system as claimed in claim 16 further comprising:
    writing and reading the original data between a host computer system and a controller system;
    mirroring the original data in the controller system to provide mirrored data; and
    writing and reading the original data and the mirrored data between the controller system and the storage subsystem or the platter.

* * * * *